(12) United States Patent  (10) Patent No.: US 8,128,144 B2
Mahara et al.  (45) Date of Patent: Mar. 6, 2012

(54) PICK-UP STYLE UTILITY VEHICLE WITH EXPANDABLE CARGO BED

(75) Inventors: Hironori Mahara, Akashi (JP); Naohisa Masuda, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 129 days.

(21) Appl. No.: 12/649,787

(22) Filed: Dec. 30, 2009

(65) Prior Publication Data

US 2011/0156422 A1 Jun. 30, 2011

(51) Int. Cl.
*B62D 33/02* (2006.01)

(52) U.S. Cl. ............... 296/24.43; 296/26.11; 296/183.2; 296/186.4; 296/64

(58) Field of Classification Search .................. 296/24.4, 296/24.43, 26.08, 26.11, 186.4, 190.11, 69, 296/183.1, 183.2
See application file for complete search history.

(56) References Cited

U.S. PATENT DOCUMENTS

| | | | | |
|---|---|---|---|---|
| 1,894,103 A * | 1/1933 | Kuenzel | ...................... | 296/24.33 |
| 3,169,792 A * | 2/1965 | Solano Viquez | ............. | 296/99.1 |
| 4,480,868 A * | 11/1984 | Koto | ........................ | 296/190.11 |
| 6,059,313 A * | 5/2000 | Coogan et al. | ................ | 280/749 |
| 6,224,132 B1 * | 5/2001 | Neale | ........................ | 296/68.1 |
| 6,276,751 B1 * | 8/2001 | Ikarashi et al. | ........... | 296/190.11 |
| 6,398,291 B1 * | 6/2002 | Reusswig et al. | .......... | 296/186.4 |
| 6,416,104 B1 * | 7/2002 | Fisher et al. | ................ | 296/37.16 |
| 6,467,828 B1 * | 10/2002 | Grydbeck et al. | ......... | 296/24.43 |
| 6,478,355 B1 * | 11/2002 | Van Eden et al. | ........... | 296/37.6 |
| 6,513,863 B1 * | 2/2003 | Renke et al. | ............. | 296/190.11 |
| 6,547,298 B2 * | 4/2003 | Sotiroff et al. | ............. | 296/24.43 |
| 6,598,921 B2 * | 7/2003 | Seel et al. | ................... | 296/24.43 |
| 6,786,535 B1 * | 9/2004 | Grzegorzewski et al. | ........................ | 296/190.11 |
| 6,796,600 B1 * | 9/2004 | Ferer et al. | ................. | 296/146.1 |
| 6,899,367 B1 * | 5/2005 | Plavetich et al. | .......... | 296/65.13 |
| 6,905,159 B1 * | 6/2005 | Saito et al. | ................. | 296/65.01 |
| 6,959,960 B2 * | 11/2005 | Buccinna et al. | ........ | 296/190.11 |
| 6,994,388 B2 * | 2/2006 | Saito et al. | .................... | 296/26.1 |
| 7,086,678 B2 * | 8/2006 | Schlecht | .................... | 296/24.43 |
| 7,093,871 B2 * | 8/2006 | Lim et al. | ................... | 296/26.08 |
| 7,140,656 B2 * | 11/2006 | Allgayer et al. | ........... | 296/24.43 |
| 7,140,659 B2 * | 11/2006 | Walter et al. | ............... | 296/37.16 |
| 7,249,798 B2 | 7/2007 | Saito et al. | | |
| 7,316,440 B2 * | 1/2008 | Walter et al. | ............... | 296/37.16 |
| 7,559,593 B2 * | 7/2009 | Luik | .......................... | 296/37.16 |
| 7,578,544 B1 * | 8/2009 | Shimamura et al. | ....... | 296/183.2 |
| 7,581,780 B2 * | 9/2009 | Shimamura et al. | ....... | 296/183.2 |

(Continued)

*Primary Examiner* — Glenn Dayoan
*Assistant Examiner* — Gregory Blankenship
(74) *Attorney, Agent, or Firm* — Wenderoth, Lind & Ponack, LLP

(57) ABSTRACT

A pick-up style utility vehicle has a front seat, a rear seat, and a cargo bed in this order from the front, a cabin frame surrounding a riding space, and a screen shield partitioning the cargo bed and a rear riding space in front of the cargo bed. The cargo bed can be changed between an expanded state in which the cargo bed is expanded in a front direction to the rear riding space and a non-expanded state not occupying the rear riding space. The upper portion of the screen shield is swingably supported by the upper portion of the cabin frame so that the screen shield can be shifted between a position in the expanded state and a position in the non-expanded state. The screen shield has a foldable folding portion, is swung in the expanded state, and is supported by a vehicle body component while being in a folded state by the folding portion.

8 Claims, 8 Drawing Sheets

U.S. PATENT DOCUMENTS

| | | | |
|---|---|---|---|
| 7,735,889 B2 * | 6/2010 | Yamamura et al. | 296/24.43 |
| 7,735,896 B2 * | 6/2010 | Kubota | 296/69 |
| 7,762,621 B2 * | 7/2010 | Duller | 296/190.11 |
| 7,841,639 B2 * | 11/2010 | Tanaka et al. | 296/65.05 |
| 2002/0070573 A1 * | 6/2002 | Song | 296/37.6 |
| 2003/0141731 A1 * | 7/2003 | Betts et al. | 296/24.1 |
| 2007/0013201 A1 * | 1/2007 | Wagner et al. | 296/24.43 |
| 2009/0256388 A1 * | 10/2009 | Tanaka et al. | 296/186.4 |

\* cited by examiner

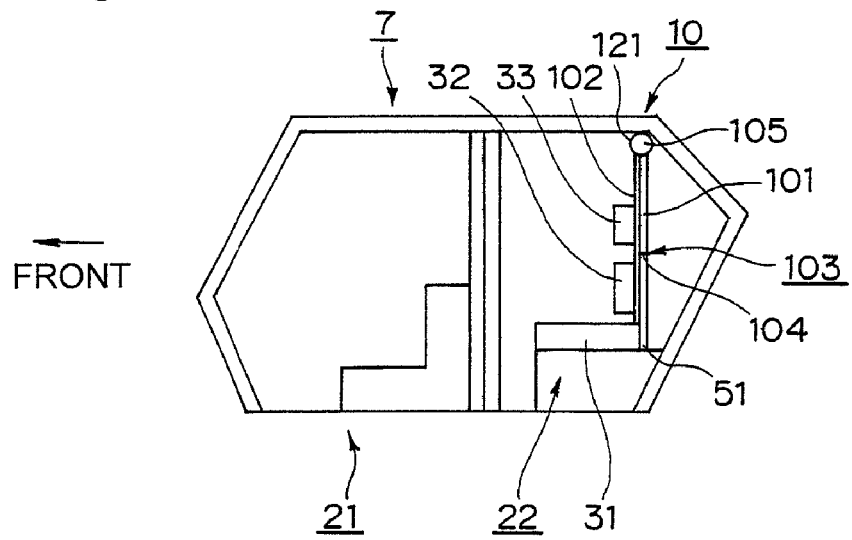
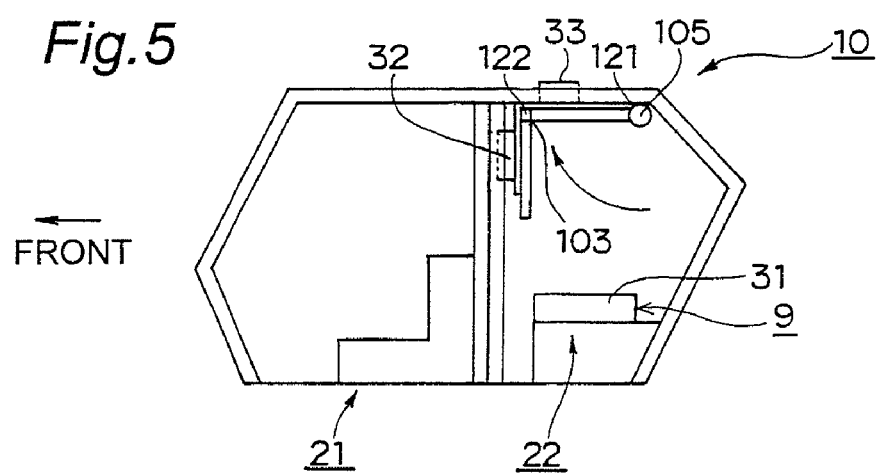
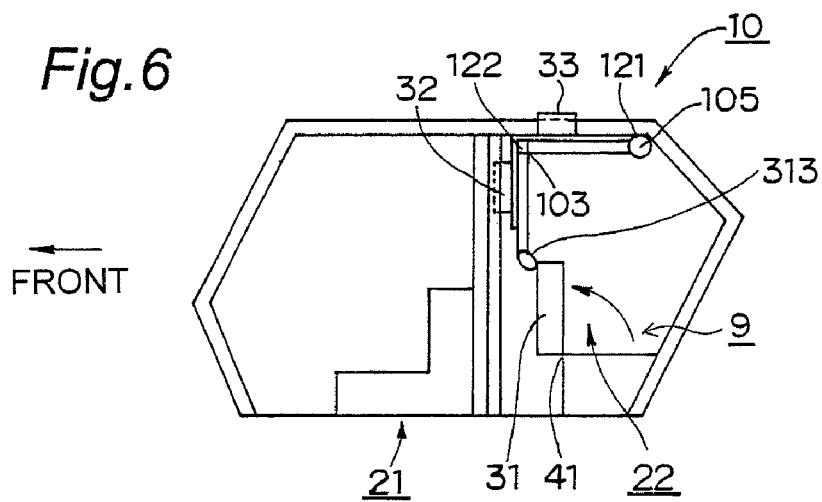

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly applied the inventions relating to the pick-up style utility vehicle with a cargo bed whose area or capacity can be expanded. Their applications have been filed, which are, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from front. The rear seat is changed between a used state and a retracted state to switch between 2 passengers transformation and 4 passengers transformation. In the 2 passengers transformation, a front portion of the cargo bed can be expanded to a riding space occupied by the rear seat in the used state.

Typically, a screen shield is provided at the front end of the cargo bed of the pick-up style utility vehicle so as not to move a load loaded on the cargo bed into the riding space in front of the cargo bed. The screen shield need be changed between the 2 passengers transformation expanding the cargo bed in a front direction, and the 4 passengers transformation not expanding the cargo bed.

FIG. 14 shows an example of the expandable cargo bed disclosed in the related art documents. A cargo bed 400 has a stationary bottom plate 401, right and left stationary side panels 402, a pair of right and left expandable side panels 404 provided at the front ends of the stationary side panels 402 and rotatably supported about hinge shafts 403, an expandable bottom plate 405 provided at the front end of the stationary bottom plate 401, and a front panel 406. A screen shield 407 is integrally formed with the front panel 406.

Pins 410 for positioning and fixing protruded in a downward direction are provided at the right and left ends of the screen shield 407. Pin insertion holes 411 and 412 into which each of the pins 410 of the screen shield 407 can be inserted are formed in the upper surface of the end of each of the expandable side panels 404 and the upper surface of the front end of each of the stationary side panels 402.

As indicated by the solid lines in FIG. 14, when the expandable side panels 404 are closed (4 passengers transformation), the screen shield 407 is located at the front ends of the stationary side panels 402 and the pins 410 of the screen shield 407 are inserted into the pin insertion holes 412 of the stationary side panels 402 from above. As indicated by the imaginary lines, when the expandable side panels 404 are opened in a front direction (2 passengers transformation), the screen shield 407 is located at the front ends of the expandable side panels 404 and the pins 410 of the screen shield 407 are inserted into the pin insertion holes 411 of the expandable side panels 404 from above.

With the above configuration, the screen shield 407 is moved between an expanded position when the cargo bed 400 is expanded and a non-expanded position when the cargo bed 400 is not expanded. The screen shield 407 need be lifted together with the front panel 406 to pull out the right and left pins 410 from the pin insertion holes 411 or 412. The screen shield 407 and the front panel 406 then need be integrally moved in a rear or front direction. After the movement, the pins 410 need be inserted into the pin insertion holes 412 or 411 from above again.

However, a weight of the screen shield 407 integrally having the front panel 406 is large, and a width of the screen shield 407 extends throughout the substantially whole width of the cargo bed 400. Therefore, it is very difficult to move the screen shield 407 by one person. Accordingly, at present, the screen shield 407 is lifted by grabbing the right and left ends of the screen shield 407 and the front panel 406 by two operators to pull out the pins 410. After the movement, the pins 410 need be inserted into the pin insertion holes 411 or 412 again. Thus, it takes time to move the screen shield 407.

SUMMARY OF THE INVENTION

The present invention has been made in view of the above problems and an object of the present invention is to simplify a moving operation of a screen shield with expanding and contracting operations of a cargo bed, thereby performing the operations easily and immediately even by one operator.

To achieve the above object, a first aspect of the present invention provides a pick-up style utility vehicle including a front seat, a rear seat, and a cargo bed in this order from front, a cabin frame surrounding a riding space, and a screen shield partitioning the cargo bed and a rear riding space in front of the cargo bed, wherein the cargo bed can be changed between an expanded state in which the cargo bed is expanded in a front direction to the rear riding space and a non-expanded state not occupying the rear riding space, the upper portion of the screen shield is swingably supported by the upper portion of the cabin frame so that the screen shield can be shifted between a position in the expanded state and a position in the non-expanded state, and the screen shield has a foldable folding portion, is swung in the expanded state, and is supported by a vehicle body component while being in a folded state by the folding portion.

With the above configuration, the position of the screen shield can be changed between the expanded position and the non-expanded position without lifting the screen shield in the operation of expanding or contracting the cargo bed. The position of the screen shield can be easily changed by one operator.

According to the present invention, preferably, the folding portion of the screen shield is supported by the upper portion of the cabin frame in the expanded state.

With the above configuration, the folding portion of the screen shield is supported by the upper portion of the cabin frame in the expanded state of the cargo bed. Therefore, the screen shield can configure the roof of the cargo bed in the expanded state of the cargo bed.

According to the present invention, preferably, a supporting portion in the upper portion of the screen shield in the cabin frame can be moved in a front-rear direction along the cabin frame.

With the above configuration, the position of the roof of the cargo bed configured by the screen shield can be moved in a front-rear direction.

According to the present invention, preferably, in the configuration in which a supporting portion in the upper portion of the screen shield in the cabin frame can be moved in a front-rear direction along the cabin frame, the supporting portion is fixed in a position corresponding to each of the expanded state and the non-expanded state.

With the above configuration, the position of the screen shield can be fixed in the expanded state or the non-expanded state of the cargo bed.

According to the present invention, preferably, a lower portion of the screen shield is supported by the side portions of the cabin frame in the expanded state.

With the above configuration, the lower portion of the screen shield is supported in the expanded state of the cargo bed. Thus, the screen shield can be supported more stably.

According to the present invention, preferably, the rear seat is rotatable so as to become in a substantially horizontal state in the non-expanded state of the cargo bed and to become in a substantially vertical state in the expanded state of the cargo bed, and the lower portion of the screen shield is supported by the rear seat in a substantially vertical state in the expanded state.

With the above configuration, the lower portion of the screen shield is supported in the expanded state of the cargo bed. Thus, the screen shield can be supported more stably.

To achieve the above object, a second aspect of the present invention provides a pick-up style utility vehicle including a front seat, a rear seat, and a cargo bed in this order from front, a cabin frame surrounding a riding space, and a screen shield partitioning the cargo bed and a rear riding space in front of the cargo bed, wherein the cargo bed can be changed between an expanded state in which the cargo bed is expanded in a front direction to the rear riding space and a non-expanded state not occupying the rear riding space, the upper portion of the screen shield is swingably supported by the upper portion of the cabin frame so that the screen shield can be shifted between a position in the expanded state and a position in the non-expanded state, the screen shield and the rear seat are coupled by a coupling portion, and the rear seat has a foldable folding portion coupling a backrest portion and a seat bottom portion of the rear seat and the coupling portion and the folding portion are supported by the upper portion of the cabin frame in the expanded state.

With the above configuration, the position of the screen shield can be changed between the expanded position and the non-expanded position without lifting the screen shield in the operation of expanding or contracting the cargo bed. The position of the screen shield can be easily changed by one operator. The coupling portion of the screen shield and the rear seat and the folding portion of the rear seat are supported by the upper portion of the cabin frame in the expanded state of the cargo bed. Therefore, the screen shield and the backrest portion of the rear seat can configure the roof of the cargo bed in the expanded state of the cargo bed.

According to the present invention, preferably, the backrest portion and the seat bottom portion become in a substantially straight line by the folding portion in the expanded state and the end of the seat bottom portion is supported by the upper portion of the cabin frame.

With the above configuration, the seat bottom portion of the rear seat can configure the roof of the riding space in the expanded state of the cargo bed.

According to the present invention, preferably, the backrest portion and the seat bottom portion are folded each other by the folding portion in the expanded state and the end of the seat bottom portion is supported by the front seat.

With the above configuration, the seat bottom portion of the rear seat can configure a headrest for a person seating on the front seat in the expanded state of the cargo bed.

BRIEF DESCRIPTION OF THE DRAWINGS

FIG. 4 is a left side schematic diagram of the pick-up style utility vehicle in 4 passengers transformation;

FIG. 5 is a left side schematic diagram of the pick-up style utility vehicle when the 4 passengers transformation is changed to 2 passengers transformation;

FIG. 6 is a left side schematic diagram of the pick-up style utility vehicle in the 2 passengers transformation;

DETAILED DESCRIPTION OF THE PREFERRED EMBODIMENTS

First Embodiment of the Present Invention

Figure 1:
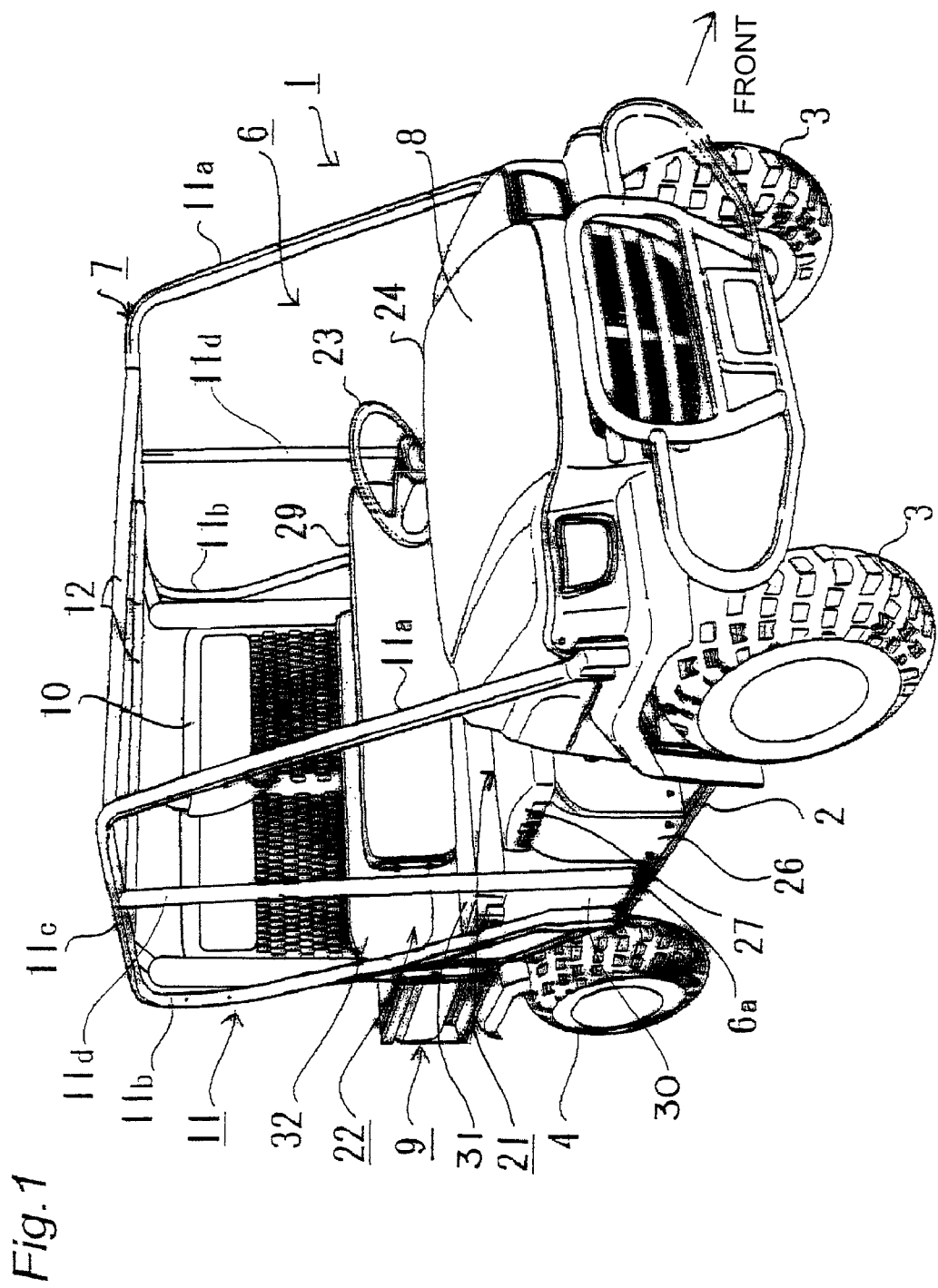
FIG. 1 is an overall perspective view of a pick-up style utility vehicle according to a first embodiment of the present invention.
Figure 2:
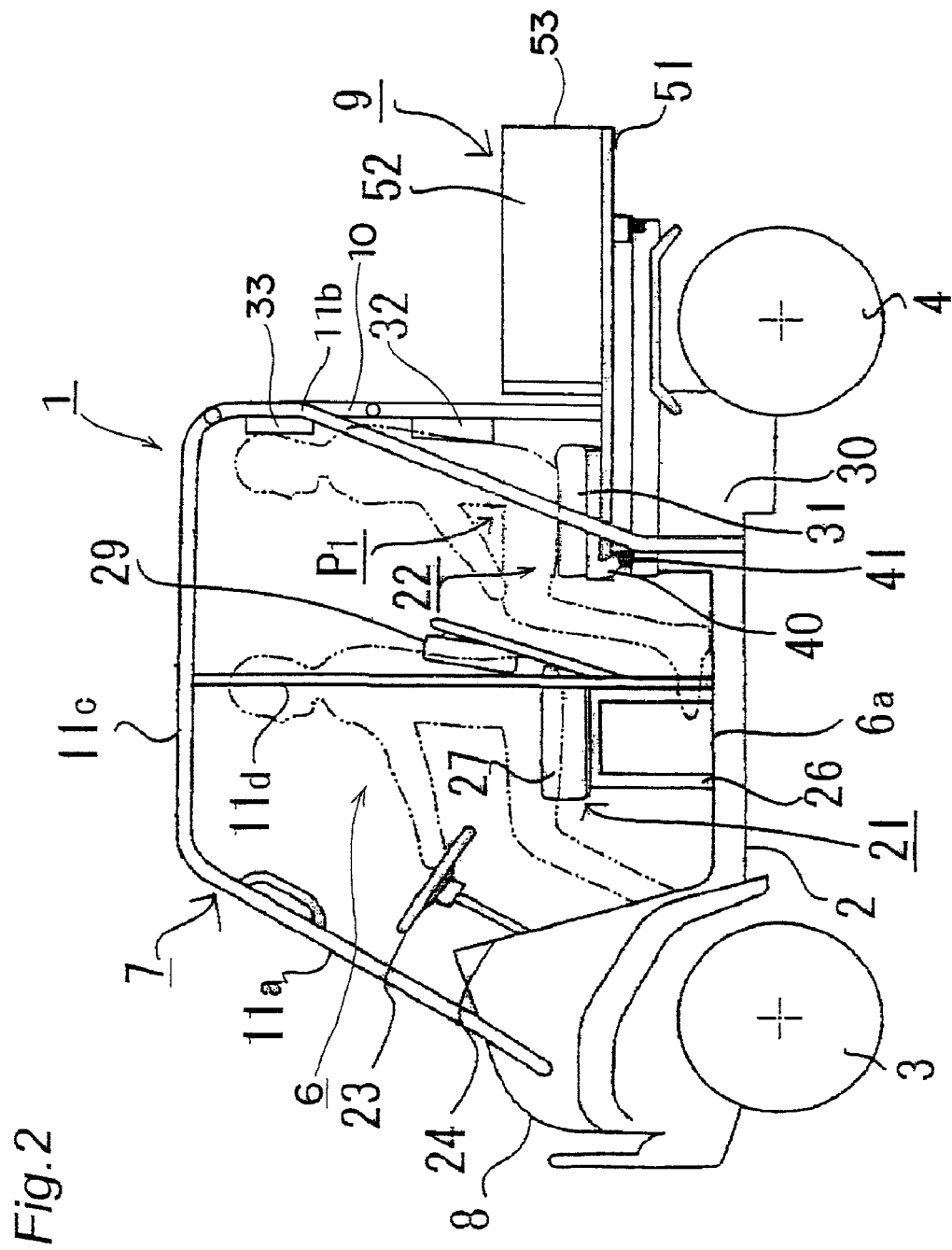
FIG. 2 is a left side view of the pick-up style utility vehicle of FIG. 1 when a cargo bed is in a non-expanded state.
Figure 3:
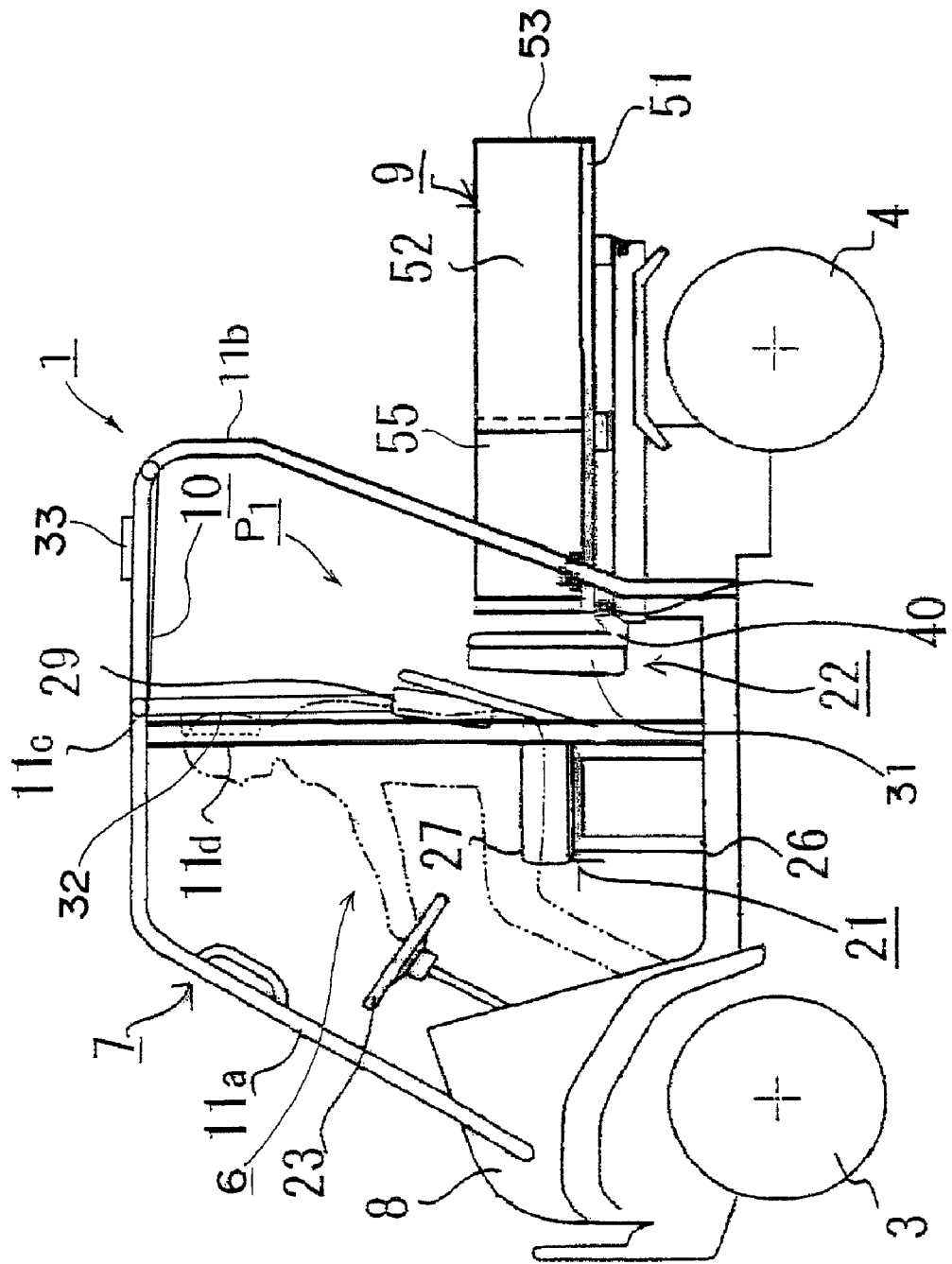
FIG. 3 is a left side view of the pick-up style utility vehicle of FIG. 1 when the cargo bed is in an expanded state.

FIGS. 1 to 3 show a pick-up style utility vehicle 1 with an expandable cargo bed according to a first embodiment of the present invention. The pick-up style utility vehicle 1 can be changed between 4 passengers transformation contracting a cargo bed 9, as shown in FIG. 2 and 2 passengers transformation folding a rear seat 22 and expanding the cargo bed 9 in a front direction, as shown in FIG. 3. The configuration of the pick-up style utility vehicle will be described below in detail with reference to the drawings.

FIG. 1 is a perspective view of the pick-up style utility vehicle 1. The pick-up style utility vehicle 1 has a vehicle body 2 supported by a pair of right and left front wheels 3 and a pair of right and left rear wheels 4. A cabin frame 7 configuring a cabin 6 is provided in an intermediate portion above the vehicle body 2 in a front-rear direction. A hood 8 is provided in front of the cabin frame 7. The cargo bed 9 is provided behind the cabin frame 7. A screen shield 10 partitioning the cargo bed 9 and a riding space is provided at the front end of the cargo bed 9 so as to be adjustable in a front-rear direction.

The cabin frame 7 surrounding the cabin 6 has a pair of right and left side frame members 11 formed in an inverted U-shape and made of metal pipes, and a plurality of cross frame members 12 made of metal pipes coupling the side frame members 11. Each of the side frame members 11 has a front side portion 11a extended in a rear direction and in an up direction from near the right or left side portion of the hood 8, a rear side portion 11b extended in a substantially up direction from the right or left side portion at the rear end of the cabin 6, an upper side portion 11c integrally coupling the upper end of the front side portion 11a and the upper end of the rear side portion 11b and extended in a front-rear direction, and an intermediate longitudinal portion 11d coupling the intermediate portion of the upper side portion 11c in a front-rear direction and a floor surface 6a.

A bench-shaped front seat 21 is installed in the front half portion of the cabin 6. A bench-shaped rear seat 22 is installed in the rear half portion of the cabin 6. A dashboard (operating portion) 24 having a steering wheel 23 and the like is provided at the front end of the cabin 6.

FIG. 2 is a left side view of the pick-up style utility vehicle 1 in the 4 passengers transformation. The bench-shaped front seat 21 has a seat leg 26 erected on the floor surface 6a of the cabin 6, a seat bottom 27 provided on the upper end face of the seat leg 26, and a backrest 29 fixed via a supporting stay on the intermediate longitudinal portions 11d. The bench-shaped front seat 21 is typically extended in a right-left direction to near the right and left ends of the cabin 6. With this configuration, two persons can be seated on the bench-shaped front seat 21 side by side. A driver can be seated on one of seating areas (left side) and a passenger can be seated on the other seating area. The bench-shaped rear seat 22 has a seat bottom 31 arranged on the upper side of a box 30 housing an engine (not shown). As in the front seat 21, the seat bottom 31 is extended in a right-left direction to near the right and left ends of the cabin 6. Therefore, two passengers can be seated on the bench-shaped rear seat 22 side by side.

The configuration of the rear seat 22 will be described in detail. The seat bottom 31 is fixed onto the upper surface of a supporting base 40. The front end of the supporting base 40 is rotatably supported at the front upper end of the box 30 via hinges 41.

FIG. 3 is a left side view of the pick-up style utility vehicle 1 in the 2 passengers transformation. The seat bottom 31 is rotated about the hinges 41 so as to become in a substantially vertical state so that the rear seat 22 becomes in a retracted state. The rear seat 22 is retracted to use a rear portion riding space P1 as the forward expanded space of the cargo bed 9.

The cargo bed 9 has, as a basic configuration, a bottom plate 51, a pair of stationary side panels 52 provided substantially perpendicular to the bottom plate 51 along the right and left ends of the bottom plate 51, and an openable and closeable gate-shaped rear panel 53 provided at the rear end of the bottom plate 51. In addition to these members, as shown in FIG. 3, the cargo bed 9 has a pair of right and left expandable side panels 55 for expanding the cargo bed 9 in a front direction.

The configuration of the screen shield 10 will be described in detail. FIG. 4 is a left side schematic diagram of the pick-up style utility vehicle in the 4 passengers transformation. FIG. 6 is a left side schematic diagram of the pick-up style utility vehicle in the 2 passengers transformation. FIG. 5 is a left side schematic diagram of the pick-up style utility vehicle when the 4 passengers transformation is changed to the 2 passengers transformation. The screen shield 10 has a frame member 101 and a net 102 attached to the frame member 101. A backrest 32 and a headrest 33 for the passenger seating on the rear seat 22 are attached to the net 102.

The upper portion of the frame member 101 is swingably supported by a first cross frame member 121 in the cross frame members 12 in the upper portion of the cabin frame 7 via hinges 105. The lower portion of the frame member 101 is inserted into a bottom plate 51 of the cargo bed 9 and the frame member 101 is fixed. A means for fixing the frame member 101 to the bottom plate 51 may be of an insertion type, a hook type, or a pin type inserting pins from the right and left side panels of the bottom plate 51.

The frame member 101 has a folding portion 103 in the intermediate portion in an up-down direction. The frame member 101 can be folded via hinges 104 in the folding portion 103. When the frame member 101 is folded by the folding portion 103, the net 102 attached to the frame member 101 is folded by the folding portion 103. The folding portion 103 is supported by the side frame members 11 in the 4 passengers transformation. The folding portion 103 is supported by a second cross frame member 122 in the cross frame members 12 in the 2 passengers transformation. As shown in FIGS. 5 and 6, the second cross frame member 122 is located in front of a first cross frame member 121 supporting the upper portion of the frame member 101. As a result, when the folding portion 103 is supported by the second cross frame member 122, a portion of the screen shield 10 configures the roof of the expanded cargo bed 9. As shown in FIG. 6, the lower portion of the screen shield 10 is supported by a supporting member 313 in the upper portion of the seat bottom 31 in a substantially vertical state.

The operation of changing the 4 passengers transformation shown in FIG. 4 to the 2 passengers transformation shown in FIG. 6 and expanding the cargo bed 9 will be described.

In the 4 passengers transformation shown in FIG. 4, the upper portion of the screen shield 10 is supported by the cross frame member 121 and the lower portion of the screen shield 10 is inserted into the bottom plate 51 of the cargo bed 9 so as to be fixed behind the rear seat 22. Then, the screen shield 10 becomes in a substantially vertical state.

When the 4 passengers transformation is changed to the 2 passengers transformation, the lower portion of the screen shield 10 is pulled out from the bottom plate 51 of the cargo bed 9.

As shown in FIG. 5, until the upper portion of the screen shield 10 becomes in a substantially horizontal state, the screen shield 10 is rotated in a front direction via hinges 105 and the folding portion 103 of the screen shield 10 is supported by the cross frame member 122.

The lower portion of the screen shield 10 is folded with the folding portion 103 as a start point so that the lower portion of the screen shield 10 becomes in a substantially vertical state relative to the upper portion of the screen shield 10 in a substantially horizontal state. As shown in FIG. 6, the seat bottom 31 of the rear seat 22 is rotated about the hinges 41 so as to become in a substantially vertical state. The lower portion of the screen shield 10 is supported by the supporting member 313 in the upper portion of the seat bottom 31 in a substantially vertical state.

As described above, in this embodiment, it is not necessary to lift and move the screen shield 10. The operation of changing the 4 passengers transformation to the 2 passengers transformation can be easily performed by one person. In the 2 passengers transformation, the upper portion of the screen shield 10 can configure the roof of the cargo bed 9 and shield a load on the cargo bed 9 from sunlight and rain. Further, in the 2 passengers transformation, the lower portion of the screen shield 10 is supported by the supporting member 313 in the upper portion of the seat bottom 31. Thus, the screen shield 10 can be supported more stably.

When the 2 passengers transformation shown in FIG. 6 is changed to the 4 passengers transformation shown in FIG. 4 and the cargo bed 9 is in the non-expanded state, the expanding operation may be reversed. Also in this case, it is not necessary to lift and move the screen shield 10, so that the operation of changing the 2 passengers transformation to the 4 passengers transformation can be easily performed by one person.

Figure 7:
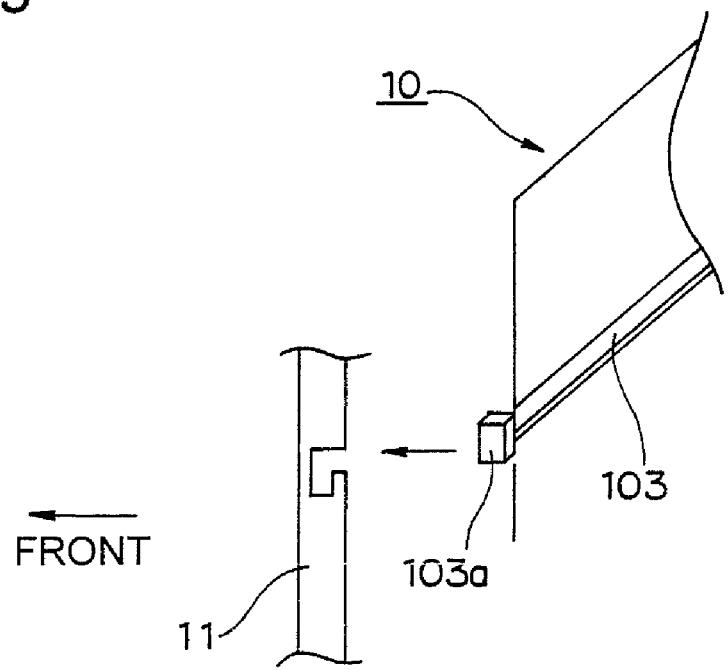
FIG. 7 is a concept view showing a portion in which the folding portion 103 is supported.

A holding member such as a clamp may be used as a supporting means of the folding portion 103 of the screen shield 10 relative to the side frame members 11 or the cross frame member 122. As shown in FIG. 7, right and left ends 103a of the folding portion 103 may be fitted into the side frame members 11 or the cross frame member 122.

Figure 8:
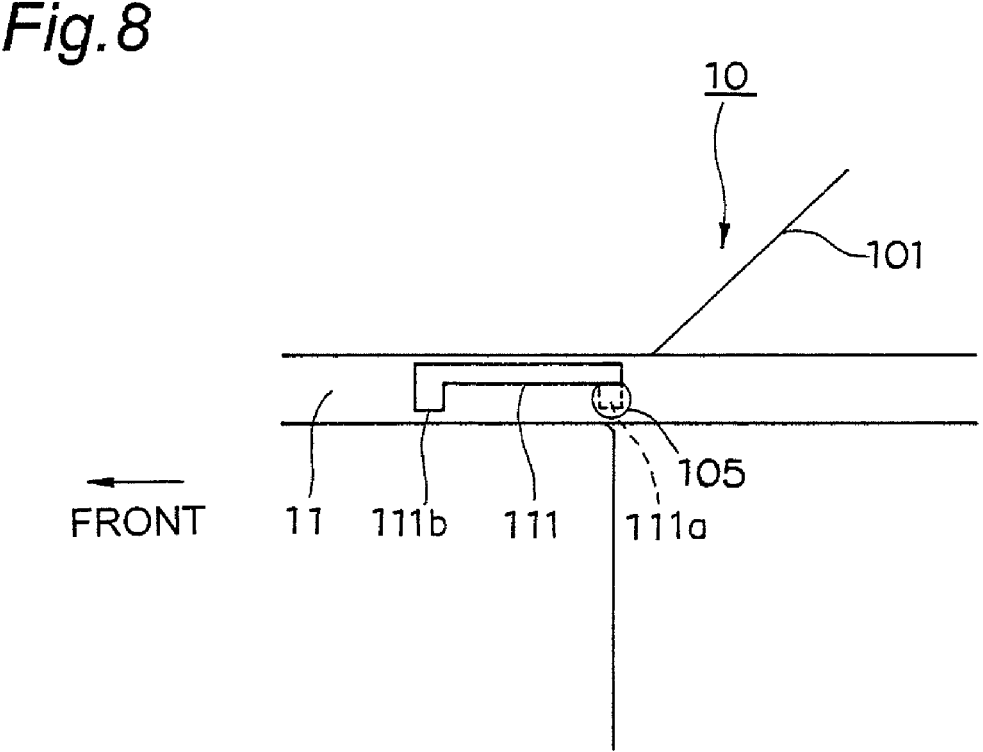
FIG. 8 is a concept view showing a portion in which the screen shield 10 is supported by the side frame member 11.

As shown in FIG. 8, the upper portion of the frame member 101 may be swingably supported by the side frame members 11 of the cabin frame 7 via the hinges 105. The side frame members 11 have long holes 111 which are long in a front-rear direction. The hinges 105 may be moved along the long holes 111 in the long holes 111 so as to be movable in a front-rear direction relative to the side frame members 11. In this case, the hinges 105 are preferably fixed in an upper positions 111a of the screen shield 10 in the non-expanded state of the cargo bed 9 and an upper positions 111b of the screen shield 10 in the expanded state of the cargo bed 9. As shown in FIG. 8, in a fixing means of the hinges 105, the long holes 111 may have recess portions in the positions 111a and 111b and the hinges 105 may be fitted in the recess portions. With the above configuration, the position of the roof of the cargo bed 9 configured by the screen shield 10 can be moved in a front-rear direction and the position of the screen shield 10 can be fixed in the expanded state and the non-expanded state of the cargo bed 9.

In FIG. 6, in the 2 passengers transformation, the backrest 32 and the headrest 33 are attached to the screen shield 10. However, the backrest 32 and the headrest 33 can be attached to and detached from the net 102 of the screen shield 10. In the 2 passengers transformation, the backrest 32 and the headrest 33 may be detached from the net 102. When the backrest 32 is not detached in the 2 passengers transformation, the backrest 32 can be used as a headrest of the passenger on the front seat 21.

In this embodiment, the upper portion of the frame member 101 is supported by the first cross frame member 121 and the folding portion 103 is supported by the second cross frame member 122. However, the upper portion of the frame member 101 and the folding portion 103 may be configured so as to be supported by the upper portion of the cabin frame such as the upper side portions 11c of the side frame members 11.

Second Embodiment

Figure 9:
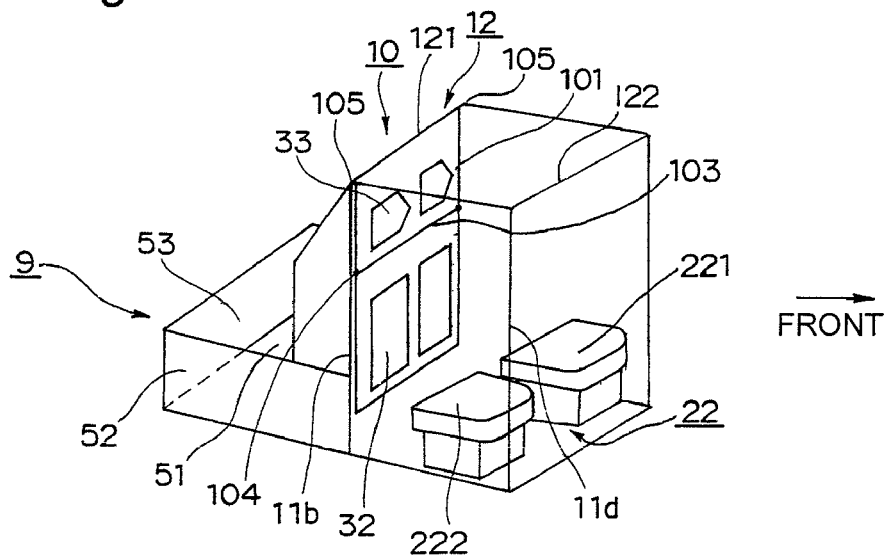
FIG. 9 is a right perspective view of the expandable cargo bed 9 and screen shield 10 in the 4 passengers transformation of the pick-up style utility vehicle according to a second embodiment of the present invention.
Figure 10:
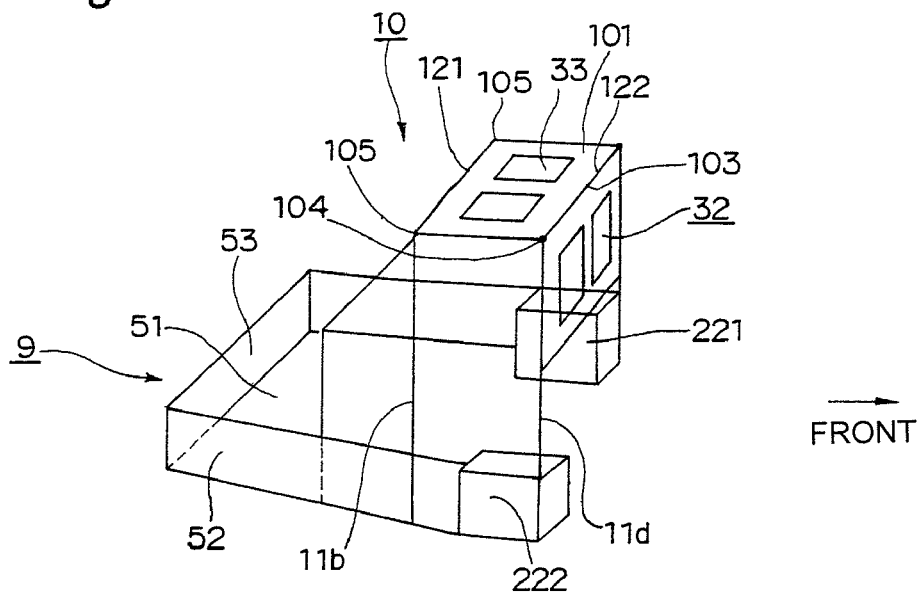
FIG. 10 is a right perspective view of expandable cargo bed 9 and screen shield 10 in the 2 passengers transformation.

FIGS. 9 and 10 are a second embodiment of the present invention. FIG. 9 is a right perspective view of the expandable cargo bed 9 and the screen shield 10 in the 4 passengers transformation. FIG. 10 is a right perspective view of the expandable cargo bed 9 and the screen shield 10 in the 2 passengers transformation. The second embodiment has the same configuration as that of the first embodiment except that the following configurations (a) and (b) are different. Like components are indicated by like reference numerals.

(a) As shown in FIG. 9, the rear seat 22 is divided into a rear left seat 221 and a rear right seat 222. As shown in FIG. 10, in the 2 passengers transformation, the rear left seat 221 and the rear right seat 222 are erected right and left and form side panels of the expandable portions of the cargo bed 9 in front of the stationary side panels 52.

(b) In the 2 passengers transformation, the rear seat 22 forms side panels of the expandable portions of the cargo bed 9. Therefore, as shown in FIG. 10, the lower portion of the screen shield 10 is supported by the intermediate longitudinal portions 11d of the side frame members 11.

According to the second embodiment, when the cargo bed 9 is expanded, the rear seat 22 forms side panels of the expandable portions of the cargo bed 9. Therefore, it is not necessary to additionally provide the expandable side panels, so that the configuration of the cargo bed 9 can be simplified. The lower portion of the screen shield 10 is supported by the intermediate longitudinal portions 11d of the side frame members 11. Thus, the screen shield 10 can be stably supported.

Third Embodiment

Figure 11:
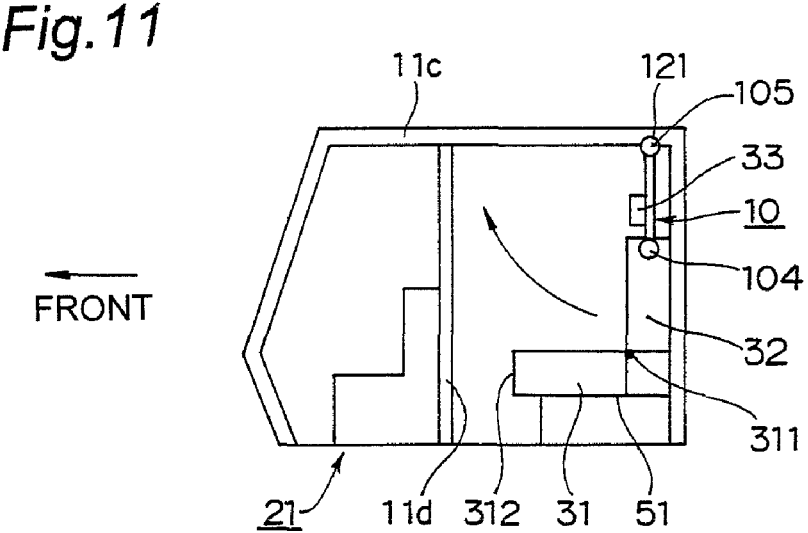
FIG. 11 is a left side schematic diagram of the pick-up style utility vehicle in the 4 passengers transformation according to a third embodiment of the present invention.
Figure 12:
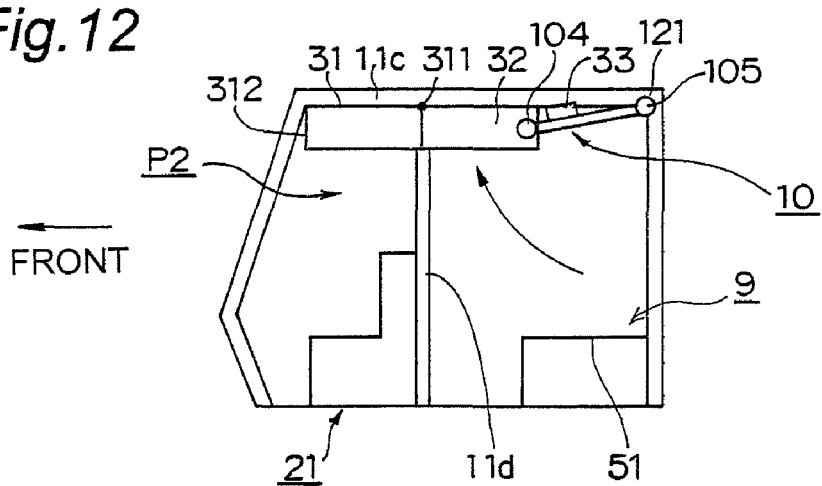
FIG. 12 is a left side concept view of the pick-up style utility vehicle in the 2 passengers transformation.

FIGS. 11 and 12 are a third embodiment of the present invention. FIGS. 11 and 12 are left side schematic diagrams of the pick-up style utility vehicle. The third embodiment has the same configuration as that of the first embodiment except that the following configurations (c) and (d) are different. Like components are indicated by like reference numerals.

(c) A headrest 33 for the passenger seating on the rear seat 22 is attached to the screen shield 10. A backrest 32 of the rear seat 22 is rotatably coupled to the screen shield 10 via coupling portions 104.

(d) The backrest 32 and the seat bottom 31 of the rear seat 22 are rotatably coupled via a folding portion 311.

The operation of changing the 4 passengers transformation shown in FIG. 11 to the 2 passengers transformation shown in FIG. 12 will be described.

In the 4 passengers transformation shown in FIG. 11, the upper portion of the screen shield 10 is supported by the cross frame member 121 via the hinges 105. The lower portion of the screen shield 10 is coupled to the backrest 32 of the rear seat 22 in a substantially vertical state via the coupling portions 104. The screen shield 10 is in a substantially vertical state. The backrest 32 is coupled to the seat bottom 31 via the folding portion 311 and the seat bottom 31 is placed on the bottom plate 51. The backrest 32 and the seat bottom 31 are folded each other by the folding portion 311.

When the 4 passengers transformation is changed to the 2 passengers transformation, as shown in FIG. 12, the screen shield 10 is rotated in a front direction via the hinges 105 until the screen shield 10 becomes in a substantially horizontal state. The coupling portions 104 of the screen shield 10 and the backrest 32 are supported by the upper side portions 11c of the side frame members 11. The folding portion 311 of the backrest 32 and the seat bottom 31 is supported by the upper side portions 11c of the side frame members 11 so that the backrest 32 becomes in a substantially straight line relative to the screen shield 10 in a substantially horizontal state.

The end 312 of the seat bottom 31 is supported by the upper side portions 11c of the side frame members 11 so that the seat bottom 31 becomes in a substantially straight line relative to the backrest 32 in a substantially horizontal state.

When the 2 passengers transformation is changed to the 4 passengers transformation, the above operation is reversed. As a result, the screen shield 10 and the backrest 32 become in a substantially vertical state and the seat bottom 31 becomes in a substantially horizontal state. The passenger can seat on the rear seat 22.

According to the third embodiment, in the 2 passengers transformation, the screen shield 10 and the backrest 32 of the rear seat 22 configure the roof of the cargo bed 9, which can shield a load on the cargo bed 9 from sunlight and rain. The seat bottom 31 of the rear seat 22 configures the roof of the front riding space P2, which can shield the passenger on the front seat 21 from sunlight and rain.

In this embodiment, the folding portion 311 is supported by the upper side portions 11c of the side frame members 11. However, the folding portion 311 may be supported by the intermediate longitudinal portions 11d of the side frame members 11.

Modification Example of the Third Embodiment

Figure 13:
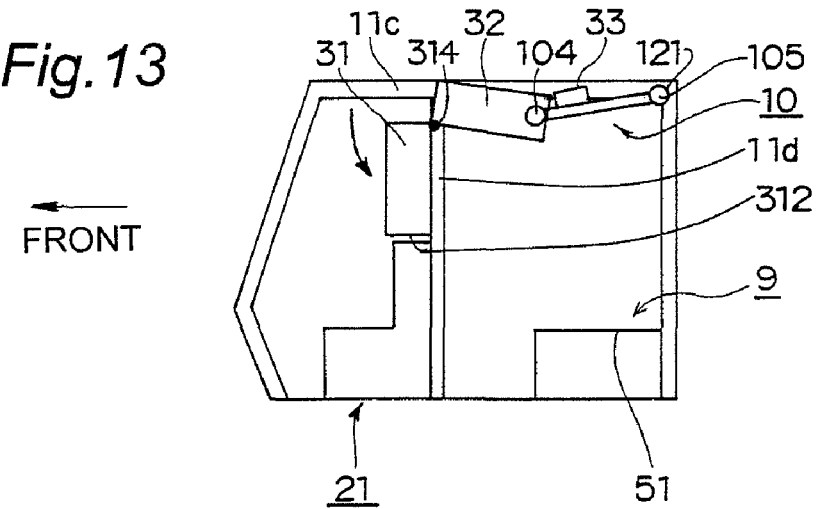
FIG. 13 is a left side schematic diagram of the pick-up style utility vehicle in the 2 passengers transformation according to a modification example of the third embodiment.
Figure 14:
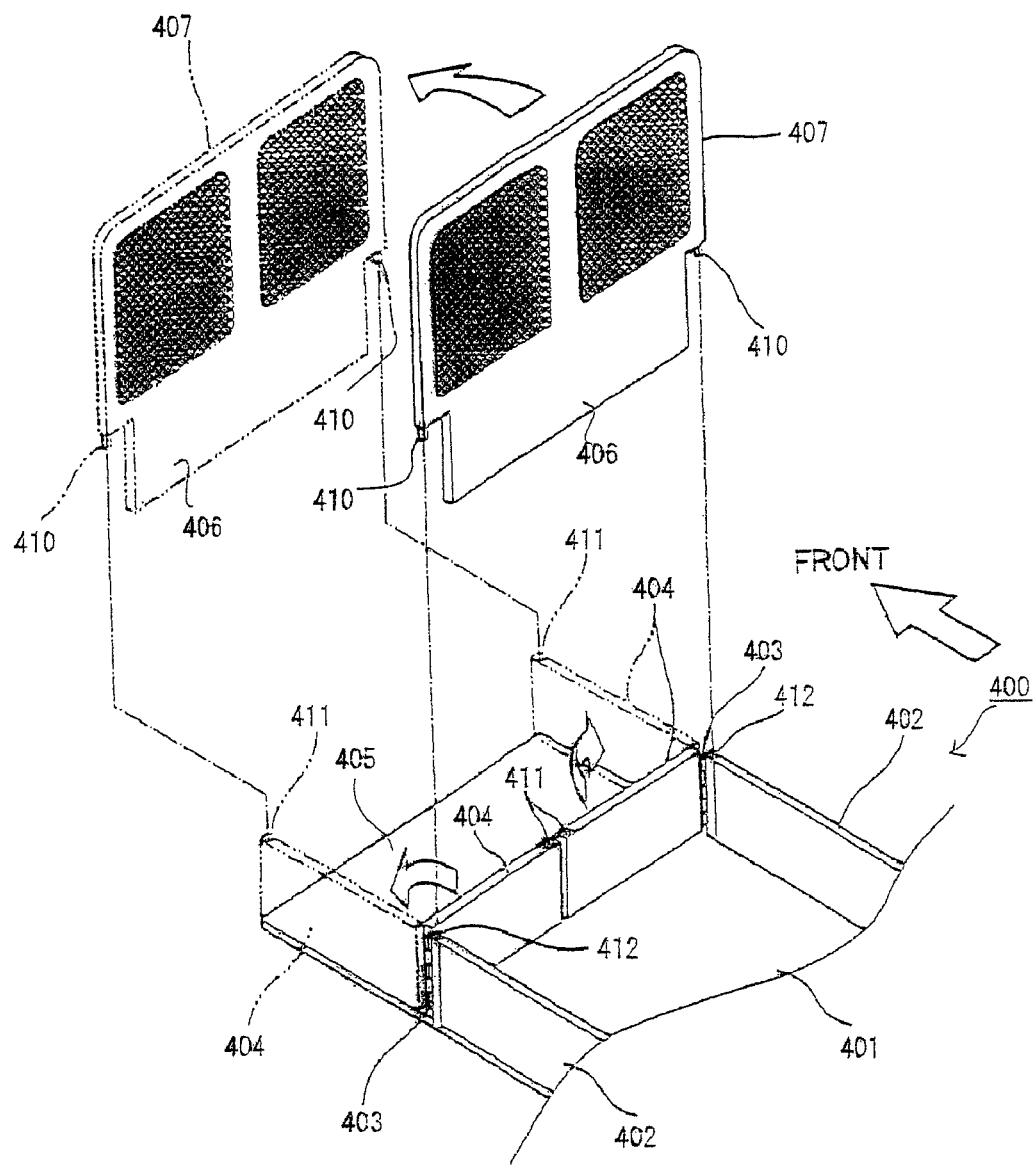
FIG. 14 is a perspective view of a cargo bed and a screen shield of the related art.

FIG. 13 is a left side schematic diagram of the pick-up style utility vehicle in the 2 passengers transformation according to a modification example of the third embodiment. In this modification example, the seat bottom 31 of the rear seat 22 is folded with folding portion 314 as a start point and becomes in a substantially vertical state relative to the screen shield 10 and the backrest 32 in a substantially horizontal state. The folding portion 314 and end 312 of the seat bottom 31 are supported by the intermediate longitudinal portions 11d of the side frame members 11.

With the above configuration, the seat bottom 31 can be used as the headrest of the passenger on the front seat 21. When the seat bottom 31 is used as the headrest, to secure the rearward view of the passenger on the front seat 21, preferably, a gap of a suitable size is provided between the front seat 21 and the seat bottom 31 or the seat bottom 31 is configured by a member enabling identification of the rear direction via the seat bottom 31. Preferably, the seat bottom 31 is configured by a mesh member or a transparent member.

The present invention is not limited to the configurations of the above embodiments and includes various modification examples contemplated in the scope without departing from the contents described in the scope of the claims.

What is claimed is:

1. A pick-up style utility vehicle comprising:
   a front seat;
   a rear seat; and
   a cargo bed in this order from a front of the vehicle;
   a cabin frame surrounding a riding space; and
   a screen shield partitioning the cargo bed and a rear riding space in front of the cargo bed, wherein:
   the cargo bed can be changed between an expanded state in which the cargo bed is expanded in a front direction into the rear riding space and a non-expanded state not occupying the rear riding space,
   an upper portion of the screen shield is swingably supported by an upper portion of the cabin frame so that the screen shield can be shifted between a position in the expanded state and a position in the non-expanded state, and
   the screen shield has a foldable folding portion, and the screen shield is swung and the folding portion is supported directly by the upper portion of the cabin frame in the expanded state, the screen shield being in a folded state by the folding portion in the expanded state.

2. The pick-up style utility vehicle according to claim 1, wherein a supporting portion in the upper portion of the screen shield in the cabin frame can be moved in a front-rear direction along the cabin frame.

3. The pick-up style utility vehicle according to claim 2, wherein the supporting portion is fixed in a position corresponding to each of the expanded state and the non-expanded state.

4. The pick-up style utility vehicle according to claim 1, wherein a lower portion of the screen shield is supported by side portions of the cabin frame in the expanded state.

5. The pick-up style utility vehicle according to claim 1, wherein the rear seat is rotatable so as to become in a substantially horizontal state in the non-expanded state of the cargo bed and to become in a substantially vertical state in the expanded state of the cargo bed,
   wherein the lower portion of the screen shield is supported by the rear seat in a substantially vertical state in the expanded state.

6. A pick-up style utility vehicle comprising:
   a front seat;
   a rear seat; and
   a cargo bed in this order from a front of the vehicle;
   a cabin frame surrounding a riding space; and
   a screen shield partitioning the cargo bed and a rear riding space in front of the cargo bed, wherein:
   the cargo bed can be changed between an expanded state in which the cargo bed is expanded in a front direction into the rear riding space and a non-expanded state not occupying the rear riding space,
   an upper portion of the screen shield is swingably supported by an upper portion of the cabin frame so that the screen shield can be shifted between a position in the expanded state and a position in the non-expanded state,
   the screen shield and the rear seat are coupled by a coupling portion, and
   the rear seat has a foldable folding portion coupling a backrest portion and a seat bottom portion of the rear seat, and the coupling portion and the folding portion are supported by the upper portion of the cabin frame in the expanded state.

7. The pick-up style utility vehicle according to claim 6, wherein the backrest portion and the seat bottom portion become in a substantially straight line by the folding portion in the expanded state and an end of the seat bottom portion is supported by the upper portion of the cabin frame.

8. The pick-up style utility vehicle according to claim 6, wherein the backrest portion and the seat bottom portion are folded relative to each other by the folding portion in the expanded state and an end of the seat bottom portion is supported by the front seat.

* * * * *